United States Patent
Yahagi et al.

(10) Patent No.: US 11,762,518 B2
(45) Date of Patent: Sep. 19, 2023

(54) TOUCH SENSOR

(71) Applicant: Panasonic Intellectual Property Management Co., Ltd., Osaka (JP)

(72) Inventors: Tsutomu Yahagi, Osaka (JP); Keishu Muraoka, Osaka (JP); Kenji Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 81 days.

(21) Appl. No.: 17/626,099

(22) PCT Filed: Jul. 16, 2020

(86) PCT No.: PCT/JP2020/027607
§ 371 (c)(1),
(2) Date: Jan. 10, 2022

(87) PCT Pub. No.: WO2021/024735
PCT Pub. Date: Feb. 11, 2021

(65) Prior Publication Data
US 2022/0261116 A1      Aug. 18, 2022

(30) Foreign Application Priority Data
Aug. 7, 2019   (JP) .................... 2019-145651

(51) Int. Cl.
*G06F 3/044*   (2006.01)
(52) U.S. Cl.
CPC .................... *G06F 3/0446* (2019.05)

(58) Field of Classification Search
CPC .. G06F 3/0446; G06F 3/04164; G06F 3/0412; G06F 2203/04112
See application file for complete search history.

(56) References Cited

U.S. PATENT DOCUMENTS

| | | | |
|---|---|---|---|
| 10,592,016 B2* | 3/2020 | Jeon | G06F 3/0448 |
| 10,788,905 B2* | 9/2020 | Kim | G06F 3/0446 |
| 10,802,621 B2* | 10/2020 | Wei | G06F 3/041 |

(Continued)

FOREIGN PATENT DOCUMENTS

JP        2017-151575       8/2017

OTHER PUBLICATIONS

International Search Report of PCT application No. PCT/JP2020/027607 dated Sep. 8, 2020.

*Primary Examiner* — Amy Onyekaba
(74) *Attorney, Agent, or Firm* — McDermott Will & Emery LLP (57) ABSTRACT

Provided are: a plurality of transmitting electrodes each extending in a first direction and spaced apart in a second direction orthogonal to the first direction; a plurality of receiving electrodes each extending in the second direction and spaced apart in the first direction; a plurality of first wires each electrically connected to one corresponding transmitting electrode included in the plurality of transmitting electrodes; and a plurality of second wires each electrically connected to one corresponding receiving electrode included in the plurality of receiving electrodes. The shortest transmitting electrode disposed at an end and the shortest receiving electrode disposed at an end do not overlap with each other in plan view.

10 Claims, 9 Drawing Sheets

(56) References Cited

U.S. PATENT DOCUMENTS

| | | | |
|---|---|---|---|
| 10,824,262 B2* | 11/2020 | Kwon | B60K 37/06 |
| 10,879,276 B2* | 12/2020 | Wu | G06F 3/0443 |
| 2014/0332256 A1* | 11/2014 | Cok | H05K 1/0274 |
| | | | 174/253 |
| 2016/0048246 A1* | 2/2016 | Park | G06F 3/04166 |
| | | | 345/173 |
| 2016/0350570 A1* | 12/2016 | Han | G06F 3/041661 |
| 2017/0336910 A1* | 11/2017 | Han | G06F 3/04164 |
| 2018/0113346 A1* | 4/2018 | Han | G06F 3/04164 |
| 2019/0109184 A1* | 4/2019 | Li | G06F 1/163 |
| 2020/0194721 A1* | 6/2020 | Lee | H10K 59/40 |

\* cited by examiner

TOUCH SENSOR

TECHNICAL FIELD

The present disclosure relates to touch sensors.

BACKGROUND ART

Conventionally, regarding touch sensors on which touch operations are possible, the touch sensor disclosed in Patent Literature (PTL) 1, for example, has been proposed.

PTL 1 discloses a touch sensor including: a first substrate and a second substrate each being in the approximate shape of a rectangle in plan view; a plurality of first electrodes and a plurality of first wires on the first substrate; and a plurality of second electrodes and a plurality of second wires on the second substrate.

The plurality of first electrodes extend in the longitudinal direction of the first substrate (the horizontal direction in FIG. 1 in PTL 1) so as to have the same length and are spaced apart in the transverse direction of the first substrate. The plurality of second electrodes extend in the transverse direction of the second substrate (the vertical direction in FIG. 1 in PTL 1) so as to have the same length and are spaced apart in the longitudinal direction of the second substrate. The region in which the plurality of first electrodes and the plurality of second electrodes are arranged is configured as a sensor region having an approximately rectangular outline in plan view (refer to FIG. 2 in PTL 1).

The plurality of first wires and the plurality of second wires are disposed outside the aforementioned sensor region. The first end portion of each of the first wires is connected to the first end portion of a corresponding one of the first electrodes (the end portion located on the left side of the first substrate illustrated in FIG. 1). Each of the first wires is laid from this end portion of a corresponding one of the first electrodes to the position of a connecting portion of the first substrate (a lower portion in FIG. 1). The first end portion of each of the second wires is connected to the first end portion of a corresponding one of the second electrodes (the end portion located below the second substrate illustrated in FIG. 1). Each of the second wires is laid from this end portion of a corresponding one of the second electrodes to the position of a connecting portion of the second substrate (a lower portion in FIG. 1).

CITATION LIST

Patent Literature

PTL 1: Unexamined Japanese Patent Publication No. 2017-151575

SUMMARY OF THE INVENTION

A touch sensor according to one exemplary embodiment of the present disclosure includes: a plurality of transmitting electrodes each extending in a first direction and spaced apart in a second direction orthogonal to the first direction; a plurality of receiving electrodes each extending in the second direction and spaced apart in the first direction; a plurality of first wires each electrically connected to one corresponding transmitting electrode included in the plurality of transmitting electrodes; and a plurality of second wires each electrically connected to one corresponding receiving electrode included in the plurality of receiving electrodes. The plurality of transmitting electrodes include transmitting electrodes of different lengths. A first transmitting electrode disposed at one end among the plurality of transmitting electrodes is shortest among the plurality of transmitting electrodes. A first receiving electrode disposed at one end among the plurality of receiving electrodes is shortest among the plurality of receiving electrodes. The first transmitting electrode and the first receiving electrode are disposed in a manner to avoid overlapping with each other in plan view. The plurality of first wires include a wire connected to an end portion of the first transmitting electrode. The plurality of second wires include a wire connected to an end portion of the first receiving electrode. The wire connected to the end portion of the first transmitting electrode and the wire connected to the end portion of the first receiving electrode are disposed in a manner to avoid overlapping with each other in plan view. The wire connected to the first transmitting electrode has a first end portion connected to the end portion of the first transmitting electrode located in a direction opposite to the first direction and has a second end portion extending toward a first region. The wire connected to the first receiving electrode has a first end portion connected to the end portion of the first receiving electrode located in the second direction and has a second end portion extending toward the first region.

DESCRIPTION OF EMBODIMENT

In a touch sensor, the outline of the sensor region is not limited to being in the approximate shape of a rectangle such as that indicated in PTL 1 and may be in the shape different from a square and a rectangle (for example, a circle), mainly from the perspective of design.

For example, the use of a plurality of first electrodes of different lengths and a plurality of second electrodes of different lengths makes it possible to form a sensor region having a circular outline.

However, directly applying the layout of the wires in PTL 1 described above to a touch sensor to which the sensor region having a circular outline is applied may cause the following problem. For example, in the sensor region having the circular outline, since the plurality of first electrodes of different lengths and the plurality of second electrodes of different lengths are used, there is a risk that first wires connected to the first electrodes and second wires connected to the second electrodes may cross each other outside the sensor region. The first wire and the second wire that cross each other are capacitively coupled at the cross point. This results in degradation in the electrical properties of the touch sensor.

Exemplary Embodiment

Hereinafter, an exemplary embodiment of the present disclosure will be described in detail with reference to the drawings. The following description of the exemplary embodiment is essentially a mere example and is not intended to limit the present disclosure, the applicable range thereof, or the usage thereof.

Figure 1:
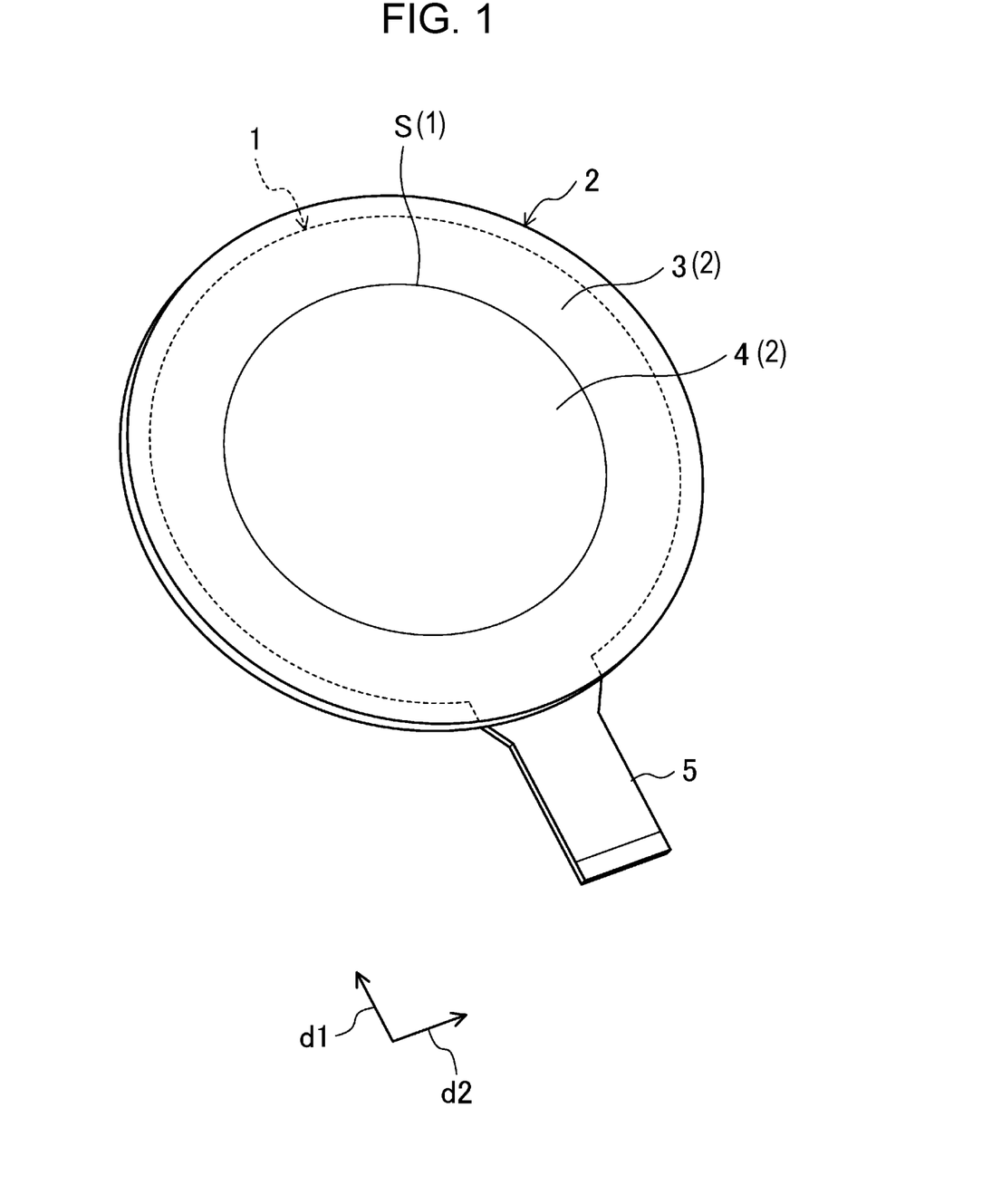
FIG. 1 is an overall perspective view of a touch sensor according to an exemplary embodiment of the present disclosure.
Figure 2:
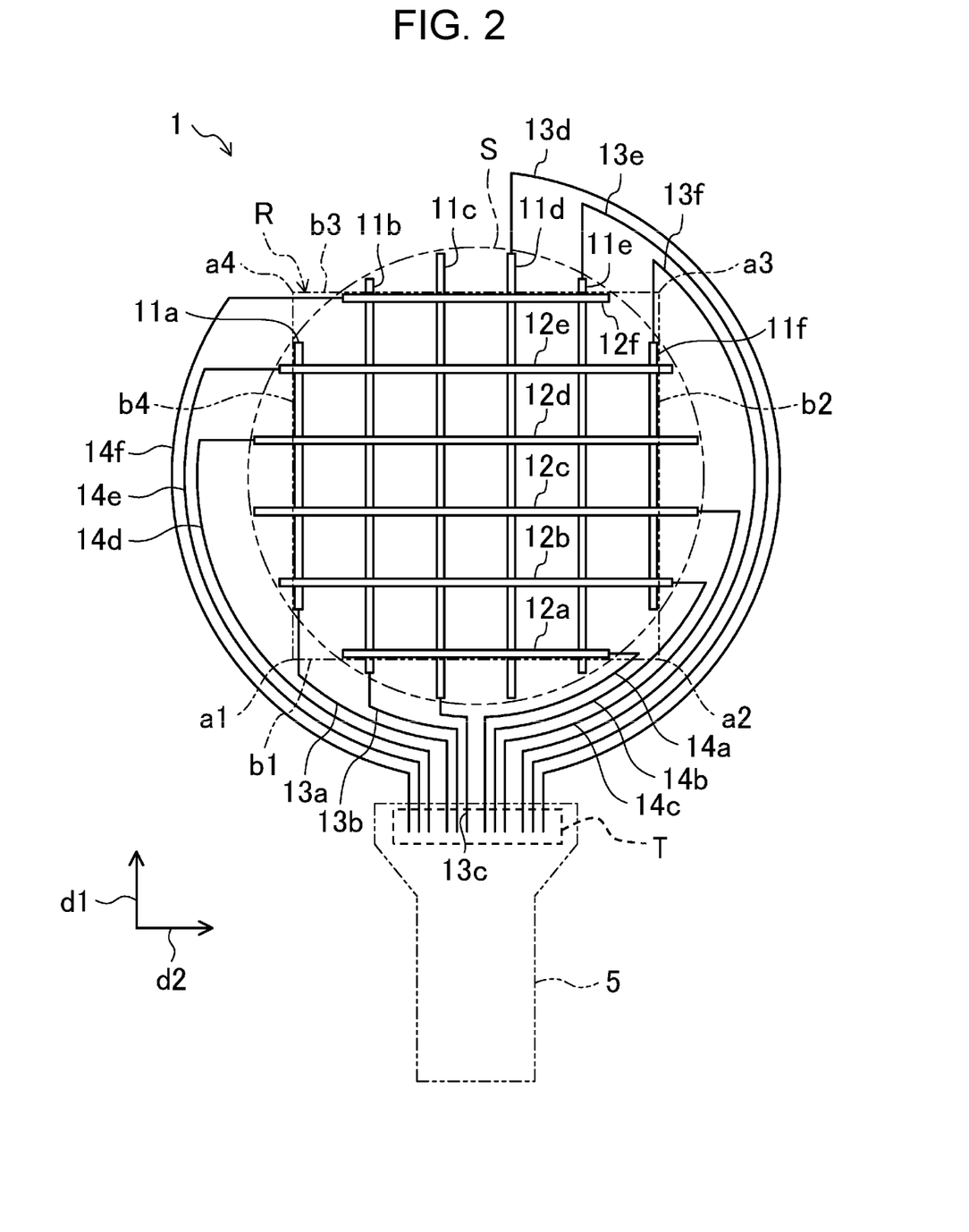
FIG. 2 is a plan view schematically illustrating a first substrate and a second substrate in layers.

FIG. 1 and FIG. 2 illustrate touch sensor 1 according to the exemplary embodiment of the present disclosure. Touch sensor 1 is a sensor-type input device on which a touch operation is possible. For example, touch sensor 1 is used as an input device for various devices incorporating display devices such as liquid-crystal displays and organic electroluminescence (EL) displays (for example, in-vehicle devices such as car navigation systems, display devices for personal computers, mobile phones, personal digital assistants, portable game consoles, photocopiers, ticket vending machines, automated teller machines, and watches and clocks).

In the present exemplary embodiment, the upward direction in FIG. 2 is defined as first direction d1, and the rightward direction in FIG. 2 (the direction orthogonal to first direction d1) is defined as second direction d2, for ease of description. Furthermore, operating surface 4 which an operator of cover member 2 to be described later touches is defined as an "upper surface", and the surface opposite to operating surface 4 is defined as a "lower surface"; thus, the vertical direction of touch sensor 1 is defined. In other words, in the present disclosure, the front of the drawing sheet of FIG. 2 is defined as "up", and the back of the drawing sheet of FIG. 2 is defined as "low". Note that this positional relationship is irrelevant to actual directions in touch sensor 1 or a device incorporating touch sensor 1; the directions in the present disclosures merely indicate the relative positional relationship.

[Cover Member]

As illustrated in FIG. 1, light-transmissive cover member 2 is provided on touch sensor 1. Cover member 2 is cover glass or a plastic cover lens. Cover member 2 is formed in the shape of an approximately circular plate, for example. Cover member 2 is layered on the upper surface of second substrate 7 to be described later.

Decorative part 3 is formed in a predetermined region from the outer edge toward the center of cover member 2. Decorative part 3 is formed by printing or the like and is in the approximate shape of a frame in dark color such as black. In the present exemplary embodiment, a surface of cover member 2 in the region surrounded by decorative part 3 is described as operating surface 4.

Note that as will be described later, decorative part 3 does not necessarily need to be formed on cover member 2 and may, for example, be formed on first substrate 6 or second substrate 7. In other words, it is sufficient that operating surface 4 of cover member 2 overlap with the region surrounded by decorative part 3 as seen in plan view.

Touch sensor 1 includes sensor region S in a region overlapping with operating surface 4 of cover member 2. As will be described in detail later, "sensor region S" refers to a region in which transmitting electrodes 11a to 11f and receiving electrodes 12a to 12f are provided. Sensor region S has an outline in the shape different from a square and a rectangle in plan view. In this exemplary embodiment, sensor region S has an approximately circular outline in plan view (refer to FIG. 2 to FIG. 4).

A user can obtain, via sensor region S, visual information from a display disposed behind touch sensor 1 and not illustrated in the drawings. The upper surface of cover member 2 that corresponds to sensor region S is configured as operating surface 4 which a finger or the like of a user touches in the touch operation.

[Flexible Wiring Board]

As illustrated in FIG. 1, flexible wiring board 5 is provided on touch sensor 1. Flexible wiring board 5 is flexible and is configured so that the electrical properties thereof do not change even when flexible wiring board 5 is deformed. Flexible wiring board 5 is a flexible insulation film including polyimide (PI), polyethylene terephthalate (PET), or polyethylene naphthalate (PEN), for example. Although not illustrated in the drawings, flexible wiring board 5 has a leading end fixed to a portion of second substrate 7 on the side of the upper surface of connecting portion 6a to be described later, with an anisotropically conductive adhesive, for example.

[First Substrate and Second Substrate]

Figure 3:
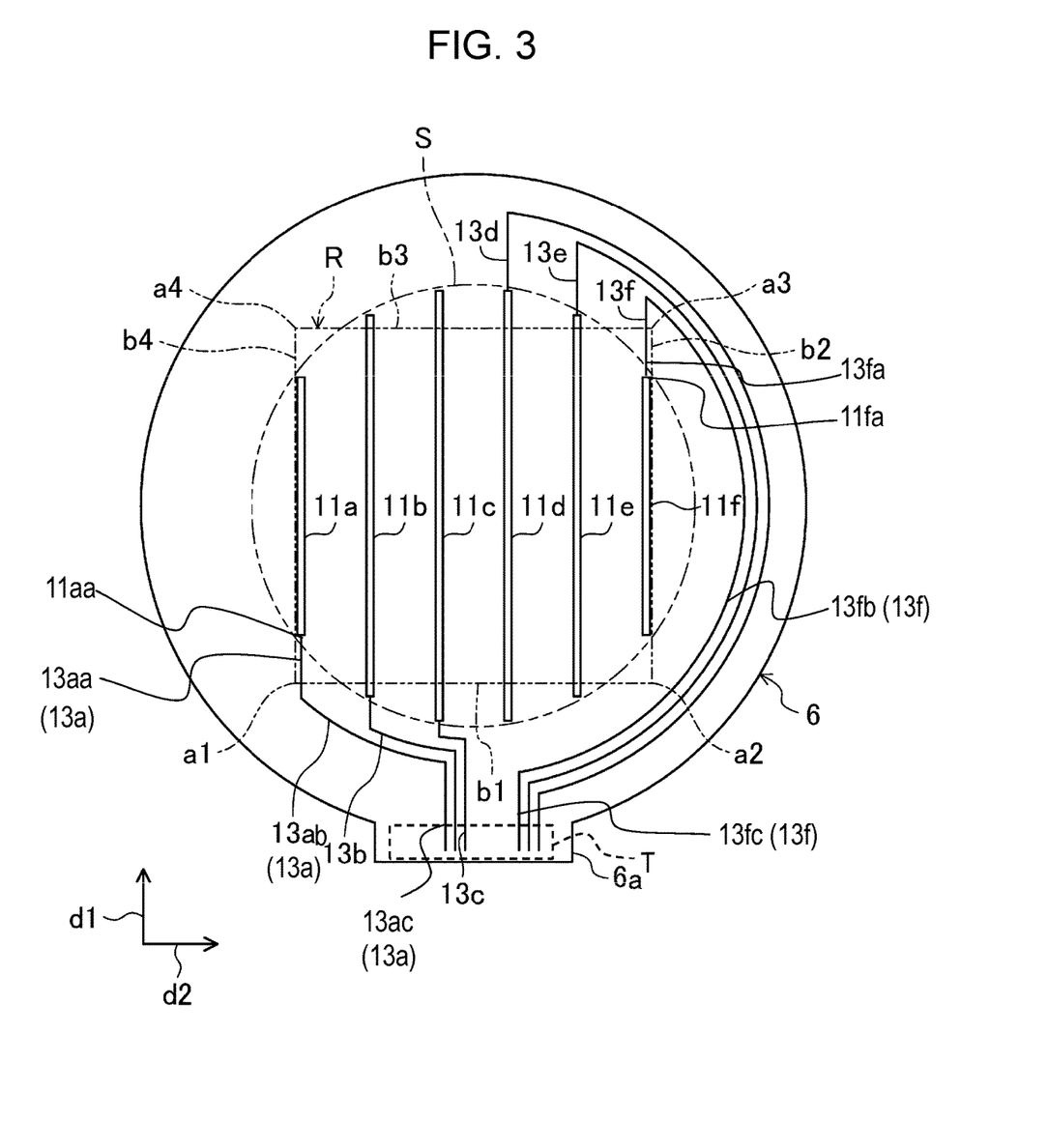
FIG. 3 is a plan view illustrating the configurations of transmitting electrodes and first wires formed on a first substrate.
Figure 4:
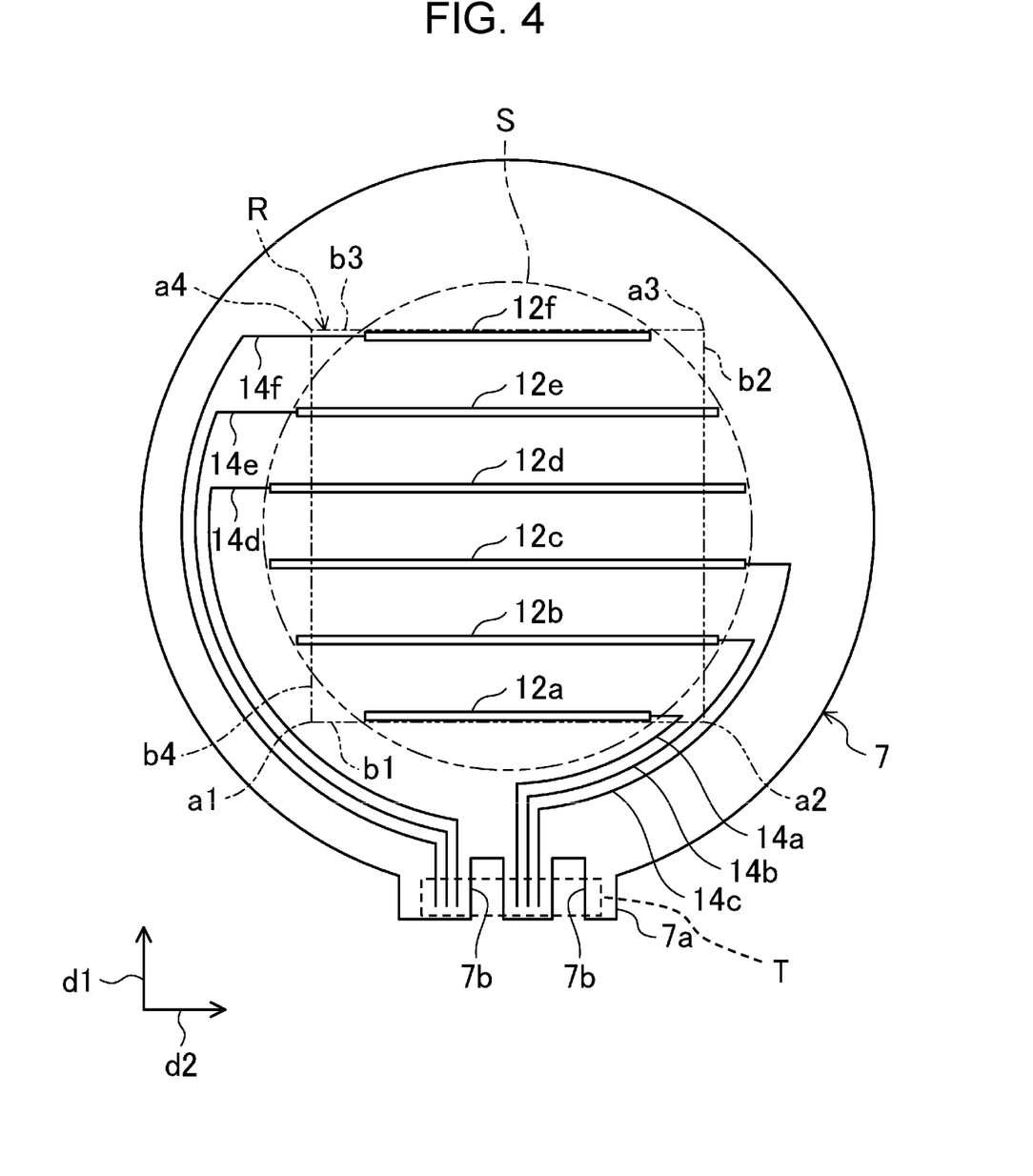
FIG. 4 is a plan view illustrating the configurations of receiving electrodes and second wires formed on a second substrate.

As illustrated in FIG. 3 and FIG. 4, touch sensor 1 includes first substrate 6 and second substrate 7. Second substrate 7 is layered on top of first substrate 6 via a light-transmissive adhesive layer (not illustrated in the drawings). Each of first substrate 6 and second substrate 7 is formed in the approximate shape of a circle.

First and second substrates 7 are made from glass or a light-transmissive resin material such as polycarbonate, polyethylene terephthalate, polyethersulfone, poly(methyl methacrylate) (PMMA) (acryl), polyacrylate, a cyclic olefin polymer (COP), and a cyclic olefin copolymer (COC), for example.

Connecting portion 6a for connecting the leading end of flexible wiring board 5 is provided on first substrate 6. Furthermore, connecting portion 7a is provided on second substrate 7. Cutout portions 7b, 7b for exposing lower end portions of first wires 13a to 13f to be described later when first substrate 6 and second substrate 7 are bonded together are formed in connecting portion 7a. A liquid-crystal display not illustrated in the drawings is disposed under first substrate 6.

Note that when second substrate 7 is made from a relatively hard material, cover member 2 does not need to be provided. In such a case, decorative part 3 in the approximate shape of a frame may be formed on second substrate 7. When cover member 2 is not provided, the surface of second substrate 7 in the region surrounded by decorative part 3 corresponds to operating surface 4.

[Transmitting Electrode and Receiving Electrode]

As illustrated in FIG. 2 to FIG. 4, touch sensor 1 includes transmitting electrodes 11a to 11f of the electrostatic capacitive type and receiving electrodes 12a to 12f of the electrostatic capacitive type. Touch sensor 1 is capable of detecting, through transmitting electrodes 11a to 11f and receiving electrodes 12a to 12f, a touch operation performed by a finger (sensing target) of a user touching operating surface 4.

Transmitting electrodes 11a to 11f and receiving electrodes 12a to 12f are configured, for example, as transparent conductive films made from light-transmissive transparent materials such as an indium tin oxide (ITO) and a tin oxide or as mesh patterns in which thin wires made from an electrically conductive metal such as copper are arranged in mesh form on the upper surface of each of first substrate 6 and second substrate 7. Note that the material of the thin wires is not limited to the electrically conductive metal and may be an electrically conductive resin material.

Transmitting electrodes 11a to 11f are connected to a drive circuit not illustrated in the drawings. Transmitting electrodes 11a to 11f are configured so as to emit an electric field to a surrounding area by this drive circuit. As illustrated in FIG. 3, transmitting electrodes 11a to 11f are formed on the upper surface of first substrate 6. Each of transmitting electrodes 11a to 11f is in the approximate shape of a strip with long sides extending in first direction d1 in plan view. Transmitting electrodes 11a to 11f are spaced apart in second direction d2.

Receiving electrodes 12a to 12f are configured to receive the electric field emitted from transmitting electrodes 11a to 11f. As illustrated in FIG. 4, receiving electrodes 12a to 12f are formed on the upper surface of second substrate 7. Each of receiving electrodes 12a to 12f is in the approximate shape of a strip with long sides extending in second direction d2 in plan view. Receiving electrodes 12a to 12f are spaced apart in first direction d1.

As illustrated in FIG. 2, receiving electrodes 12a to 12f are disposed so as to cross transmitting electrodes 11a to 11f via first substrate 6 and the adhesive layer (not illustrated in the drawings). Specifically, receiving electrodes 12a to 12f are orthogonal to transmitting electrodes 11a to 11f in the state of being insulated from transmitting electrodes 11a to 11f.

Transmitting electrodes 11a to 11f are formed so as to have at least two different lengths. In this exemplary embodiment, transmitting electrodes 11a to 11f are formed so as to have at least three different lengths. Specifically, transmitting electrodes 11a, 11f are formed so that the length thereof in first direction d1 is less than the length of transmitting electrodes 11b to 11e in first direction d1. In other words, transmitting electrodes 11a, 11f are the shortest in length. In contrast, transmitting electrodes 11c, 11d are the longest in length. Note that the length of transmitting electrodes 11b, 11e is substantially in the middle between the length of transmitting electrodes 11a, 11f and the length of transmitting electrodes 11c, 11d.

Receiving electrodes 12a to 12f are formed so as to have at least two different lengths. In this exemplary embodiment, receiving electrodes 12a to 12f are formed so as to have at least three different lengths. Specifically, receiving electrodes 12a, 12f are formed so that the length thereof in second direction d2 is less than the length of receiving electrodes 12b to 12e in second direction d2. In other words, receiving electrodes 12a, 12f are the shortest in length. In contrast, receiving electrodes 12c, 12d are the longest in length. Note that the length of receiving electrodes 12b, 12e is substantially in the middle between the length of receiving electrodes 12a, 12f and the length of receiving electrodes 12c, 12d.

Transmitting electrodes 11a to 11f and receiving electrodes 12a to 12f are disposed in sensor region S. Transmitting electrodes 11a, 11f, which are shortest, and receiving electrodes 12a, 12f, which are shortest, are disposed at the outer edge of sensor region S. Specifically, as illustrated in FIG. 2 and FIG. 3, transmitting electrode 11a is disposed at the left edge within sensor region S, and transmitting electrode 11f is disposed at the right edge within sensor region S. Furthermore, as shown in FIG. 2 and FIG. 4 receiving electrode 12a is disposed at the lower edge within sensor region S, and receiving electrode 12f is disposed at the upper edge within sensor region S.

As illustrated in FIG. 2 to FIG. 4, there is virtual rectangular region R having four sides that are opposite sides on which the pair of shortest transmitting electrodes 11a, 11f opposing each other in plan view are located and opposite sides on which the pair of shortest receiving electrodes 12a, 12f opposing each other in plan view are located. Rectangular region R is in the shape of a square or a rectangle. Rectangular region R includes first vertex a1 and third vertex a3 located on one of the diagonals and second vertex a2 and fourth vertex a4 located on the other of the diagonals. Note that the length direction of sides b2, b4 connecting first vertex a1 and second vertex a2 corresponds to first direction d1 and the length direction of sides b1, b3 connecting first vertex a1 and fourth vertex a4 corresponds to second direction d2.

As illustrated in FIG. 2, shortest transmitting electrodes 11a, 11f and shortest receiving electrodes 12a, 12f are disposed so that end portions thereof do not overlap each other at the positions of first to fourth vertices a1 to a4. For example, transmitting electrode 11a and receiving electrode 12a are disposed so that end portions thereof do not overlap each other at the position of first vertex a1.

[First Wire and Second Wire]

As illustrated in FIG. 2 to FIG. 4, touch sensor 1 includes first wires 13a to 13f and second wires 14a to 14f for electrically connecting transmitting electrodes 11a to 11f and receiving electrodes 12a to 12f to an external circuit not illustrated in the drawings. First wires 13a to 13f and second wires 14a to 14f are made from an electrically conductive, light-blocking material (for example, an electrically conductive metal such as copper or an electrically conductive resin material).

First wires 13a to 13f and second wires 14a to 14f are disposed outside sensor region S. Specifically, first wires 13a to 13f and second wires 14a to 14f are positioned to overlap decorative part 3 as viewed from above cover member 2. In other words, decorative part 3 makes first wire 13 and second wire 14 invisible from above.

As illustrated in FIG. 3, first wires 13a to 13f are disposed on the upper surface of first substrate 6. As illustrated in FIG. 4, second wires 14a to 14f are disposed on the upper surface of second substrate 7. Note that a connecting pad (not illustrated in the drawings) for electrically connecting to flexible wiring board 5 is provided on the second end portion of each of first wires 13a to 13f and second wires 14a to 14f.

[Features of Invention]

Next, as a feature of the present invention, first wires 13a, 13f having first end portions connected to end portions of shortest transmitting electrodes 11a, 11f and second wires 14a, 14f having first end portions connected to end portions of shortest receiving electrodes 12a, 12f are spaced apart from each other and disposed so that the second end portions of first wires 13a, 13f and the second end portions of second wires 14a, 14f are oriented in the same direction. This feature will be specifically described below.

As illustrated in FIG. 2 and FIG. 3, the first end portion of first wire 13a is connected to the end portion of shortest transmitting electrode 11a that is located near first vertex a1.

As illustrated in FIG. 3, first end portion 13aa of first wire 13a extends in first direction d1 from end portion 11a of transmitting electrode 11a close to connecting portion 6a to intermediate portion 13ab of first wire 13a. In other words, first end portion 13aa of first wire 13a extends from end portion 11aa of transmitting electrode 11a, which is located in the direction opposite to first direction d1, to intermediate portion 13ab of first wire 13a in first direction d1. Intermediate portion 13ab of first wire 13a extends along the outer perimeter of sensor region S from first end portion 13aa of first wire 13a to second end portion 13ac of first wire 13a. Second end portion 13ac of first wire 13a extends in first direction d1 from intermediate portion 13ab of first wire 13a to the vicinity of the outer edge of connecting portion 6a. End portion region T represents a region in which the end portions of first wires 13a to 13f are disposed. End portion region T is located within connecting portion 6a in plan view. As will be described later, the first end portions of second wires 14a to 14f are also disposed in end portion region T (refer to FIG. 4).

The first end portion of each of first wires 13b, 13c is connected to the end portion of a corresponding one of relatively long transmitting electrodes 11b, 11c that is located near first vertex a1. First wires 13b, 13c extend in the direction in which first wire 13a extends.

As illustrated in FIG. 2 and FIG. 3, the first end portion of first wire 13f is connected to the end portion of shortest transmitting electrode 11f that is located near third vertex a3.

As illustrated in FIG. 3, first end portion 13fa of second wire 13f extends in first direction d1 from end portion 11fa of transmitting electrode 11f far from connecting portion 6a to intermediate portion 13fb of first wire 13f. In other words, first end portion 13fa of first wire 13f extends in first direction d1 from end portion 11fa of transmitting electrode 11f in first direction d1 to intermediate portion 13fb of first wire 13f. Intermediate portion 13fb of first wire 13f extends along the outer perimeter of sensor region S from first end portion 13fa of first wire 13f to second end portion 13fc of first wire 13f. Second end portion 13fc of first wire 13f extends in first direction d1 from intermediate portion 13fb of first wire 13f to the vicinity of the outer edge of connecting portion 6a (end portion region T).

The first end portion of each of first wires 13d, 13e is connected to the end portion of a corresponding one of relatively long transmitting electrodes 11d, 11e that is located near third vertex a3. First wires 13d, 13e extend in the direction in which first wire 13f extends.

As illustrated in FIG. 2 and FIG. 4, the first end portion of second wire 14a is connected to the end portion of shortest receiving electrode 12a that is located near second vertex a2.

The first end portion of second wire 14a extends from receiving electrode 12d in second direction d2. The intermediate portion of second wire 14a extends from the first end portion toward the second end portion along the outer perimeter of sensor region S. The second end portion of second wire 14a extends in first direction d1 to the vicinity of the outer edge of connecting portion 7a (end portion region T).

The first end portion of each of second wires 14b, 14c is connected to the end portion of a corresponding one of relatively long receiving electrodes 12b, 12c that is located near second vertex a2. Second wires 14b, 14c extend in the direction in which second wire 14a extends.

As illustrated in FIG. 2 and FIG. 4, the first end portion of second wire 14f is connected to the end portion of shortest receiving electrode 12f that is located near fourth vertex a4.

The first end portion of second wire 14f extends in the direction opposite to second direction d2. The intermediate portion of second wire 14f extends from the first end portion toward the second end portion along the outer perimeter of sensor region S. The second end portion of second wire 14f is formed so as to extend in first direction d1 to the vicinity of the outer edge of connecting portion 7a.

The first end portion of each of second wires 14d, 14e is connected to the end portion of a corresponding one of relatively long receiving electrodes 12d, 12e that is located near fourth vertex a4. Second wires 14d, 14e extend in the direction in which second wire 14f extends.

Advantageous Effects of Exemplary Embodiment

In touch sensor 1, transmitting electrodes 11a to 11f and receiving electrodes 12a to 12f are disposed in sensor region S having a circular outline, and shortest transmitting electrodes 11a, 11f and shortest receiving electrodes 12a, 12f are disposed at the outer edge of sensor region S in such a manner that the end portions thereof do not to overlap each other. Furthermore, in touch sensor 1, first wires 13a, 13f having the first end portions connected to the end portions of shortest transmitting electrodes 11a, 11f and second wires 14a, 14f having the first end portions connected to the end portions of shortest receiving electrodes 12a, 12f are spaced apart from each other and disposed so that the second end portions of first wires 13a, 13f and the second end portions of second wires 14a, 14f are oriented in the same direction. In other words, touch sensor 1 is configured so that first wires 13a, 13f and second wires 14a, 14f do not cross each other. With this configuration, it is possible to prevent first wires 13a, 13f and second wires 14a, 14f from being capacitively coupled, making it possible to prevent the aforementioned degradation in electrical properties that is due to the capacitive coupling. Furthermore, since first wires 13a, 13f and second wires 14a, 14f are disposed so that the second end portions thereof are oriented in the same direction, connecting to an external device (not illustrated in the drawings) via flexible wiring board 5 is facilitated.

As described above, in touch sensor 1 to which sensor region S having an outline in the shape different from a square and a rectangle has been applied, it is possible to prevent degradation in electrical properties by preventing the aforementioned capacitive coupling.

Furthermore, in touch sensor 1, the first end portions of first wires 13a, 13f are connected to the end portions of shortest transmitting electrodes 11a, 11f that are located near first vertex a1 and third vertex a3, and the first end portions of second wires 14a, 14f are connected to the end portions of shortest receiving electrodes 12a, 12f that are located near second vertex a2 and fourth vertex a4. In other words, first wires 13a, 13f and second wires 14a, 14f are laid in four directions from the respective positions of first to fourth vertices a1 to a4 toward the outside of sensor region S. Thus, first wires 13a, 13f and second wires 14a, 14f do not cross each other at the respective positions of first to fourth vertices a1 to a4. As a result, it is possible to prevent degradation in electrical properties by preventing the aforementioned capacitive coupling.

Furthermore, in touch sensor 1, the first end portions of first wires 13b to 13e are connected to the end portions of relatively long transmitting electrodes 11b to 11e that are located near first vertex a1 and third vertex a3, and the first end portions of second wires 14b to 14e are connected to the end portions of relatively long receiving electrodes 12b to 12e that are located near second vertex a2 and fourth vertex a4. With this configuration, first wires 13a to 13f and second wires 14a to 14f are evenly distributed in four directions of sensor region S. As a result, it is possible to reduce the width of the frame part (decorative part 3) of touch sensor 1 which is located outside sensor region S.

Variations 1 to 3 of Exemplary Embodiment

In the above-described exemplary embodiment, sensor region S having a circular outline is applied to touch sensor 1, but this is not limiting.

Figure 5:
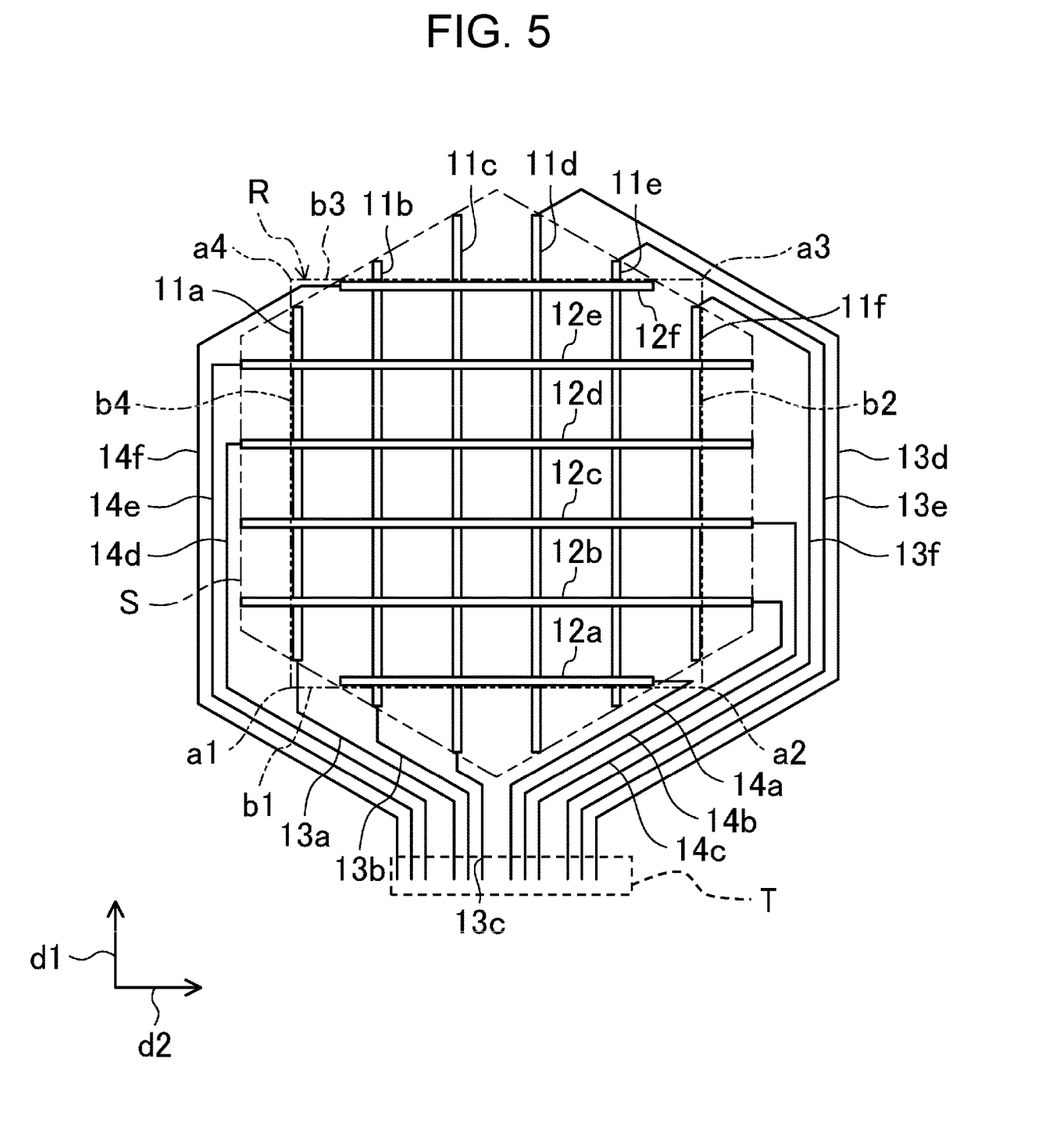
FIG. 5 is a FIG. 2-equivalent diagram illustrating the configuration according to Variation 1 of an exemplary embodiment.

For example, sensor region S having a hexagonal outline such as that according to Variation 1 illustrated in FIG. 5 may be applied to touch sensor 1. Alternatively, sensor region S having a pentagonal outline not illustrated in the drawings may be applied to touch sensor 1. This means that sensor region S having a polygonal outline including five or more vertices and five or more sides may be applied to touch sensor 1.

Figure 6:
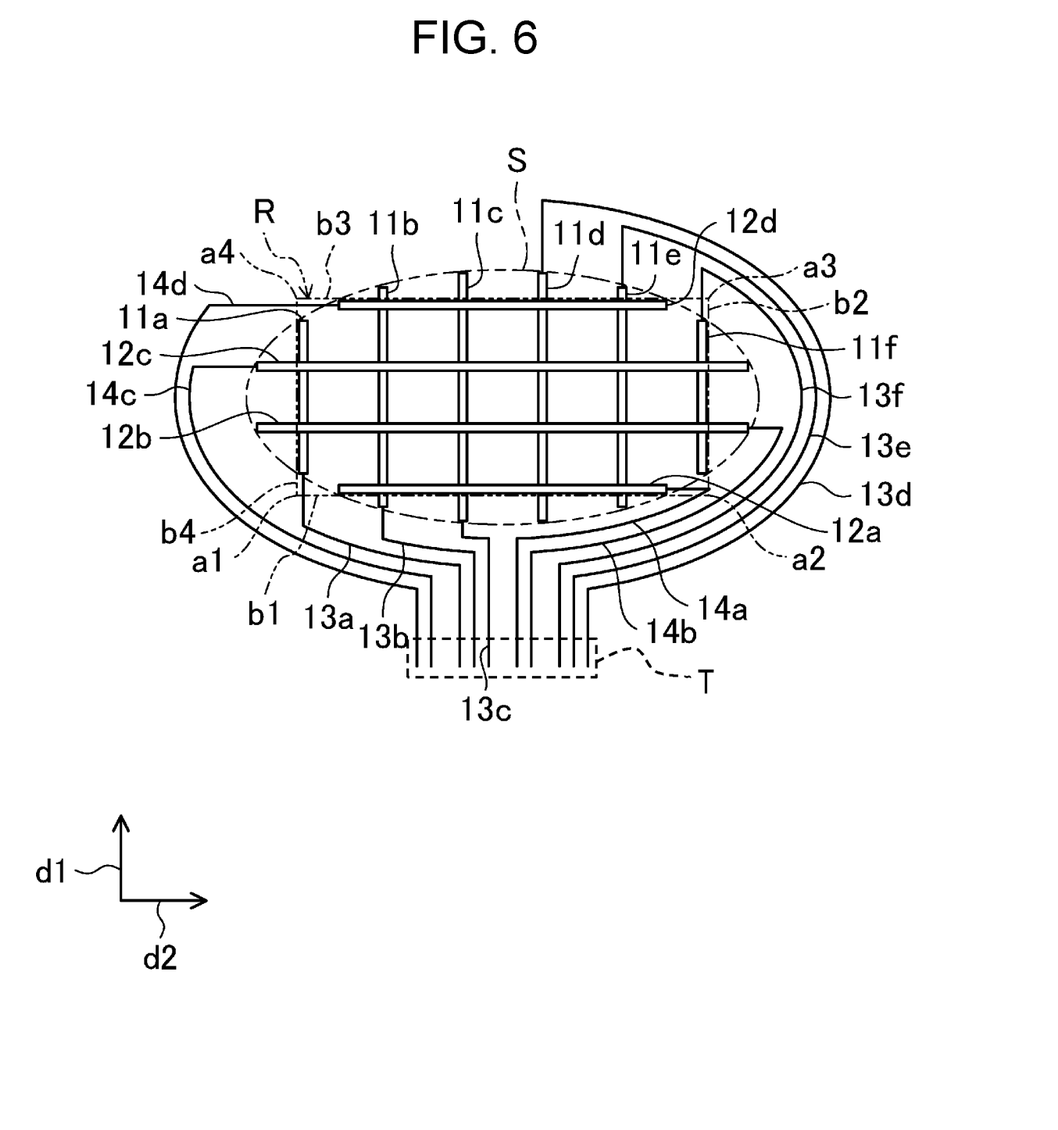
FIG. 6 is a FIG. 2-equivalent diagram illustrating the configuration according to Variation 2 of an exemplary embodiment.
Figure 7:
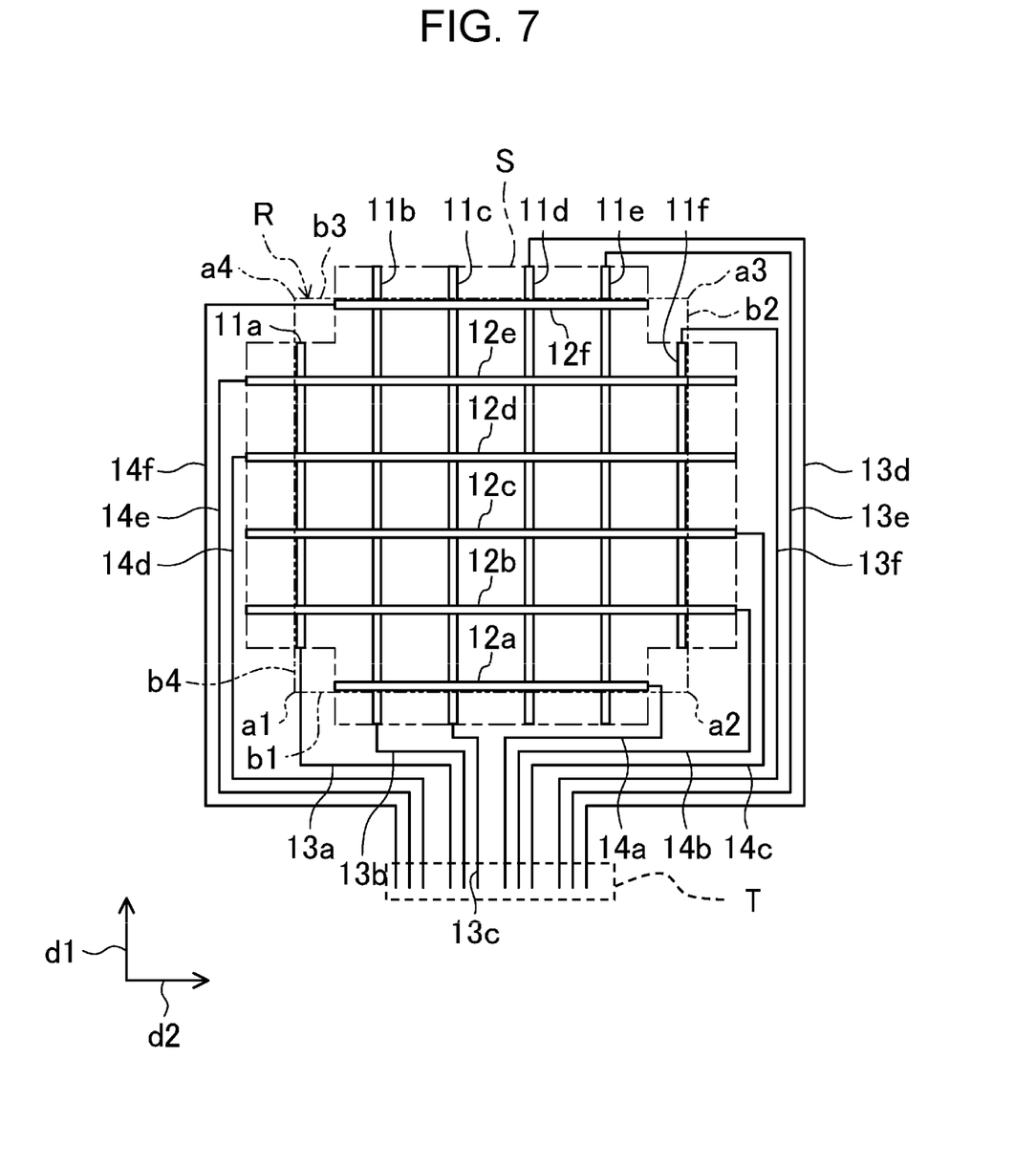
FIG. 7 is a FIG. 2-equivalent diagram illustrating the configuration according to Variation 3 of an exemplary embodiment.

Furthermore, sensor region S having an elliptical outline such as that according to Variation 2 illustrated in FIG. 6 may be applied to touch sensor 1. Moreover, sensor region S having a cross-shaped outline such as that according to Variation 3 illustrated in FIG. 7 may be applied to touch sensor 1.

Even with such touch sensors 1 according to Variations 1 to 3, advantageous effects that are substantially the same as those produced by touch sensor 1 according to the above-described exemplary embodiment can be produced.

Variation 4 of Exemplary Embodiment

In touch sensor 1 according to the above-described exemplary embodiment, first wires 13a to 13f and second wires 14a to 14f are evenly distributed in four directions of sensor region S, but this is not limiting. This means that first wires 13a to 13f and second wires 14a to 14f do not need to be evenly distributed in four directions of sensor region S.

Figure 8:
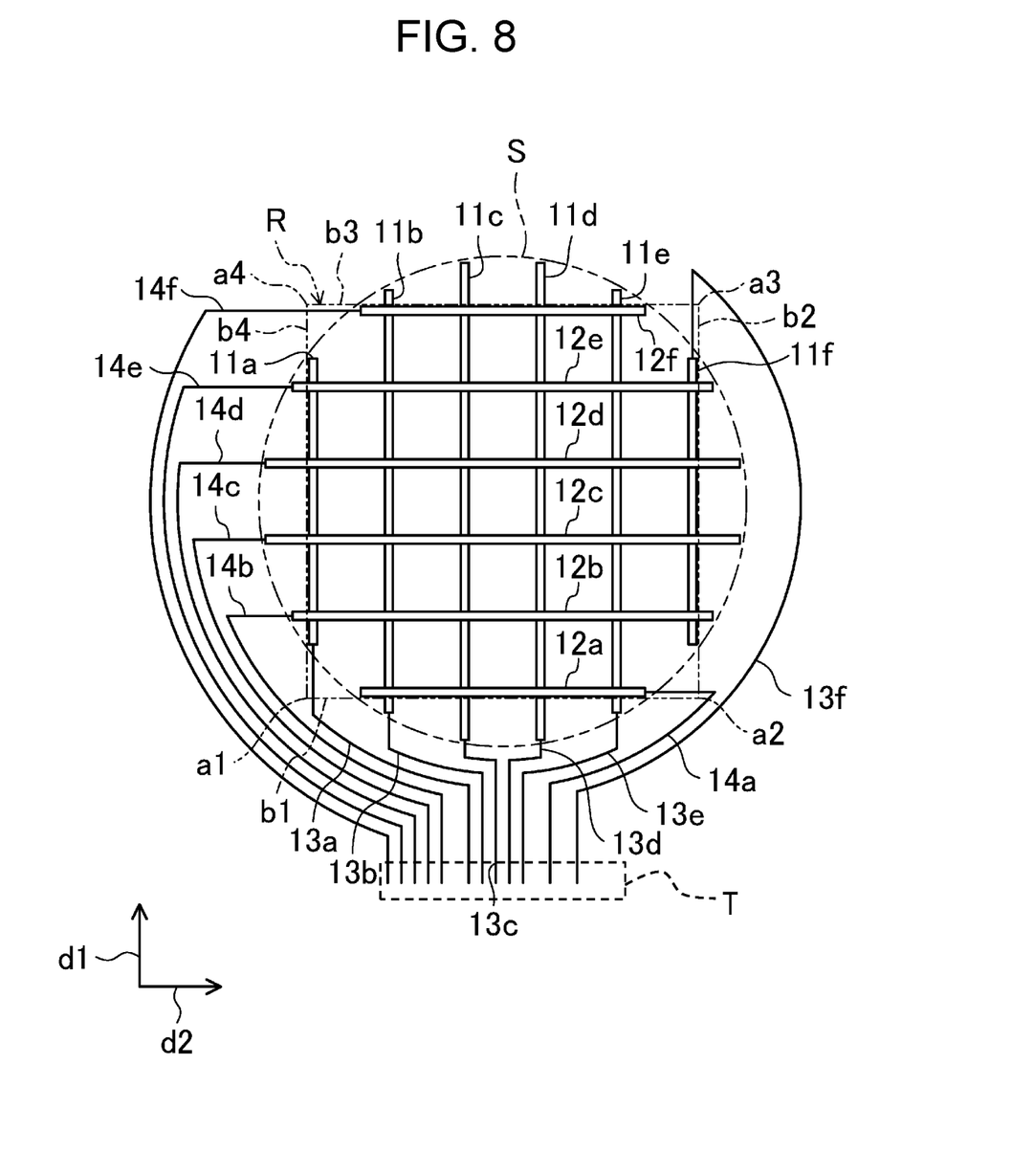
FIG. 8 is a FIG. 2-equivalent diagram illustrating the configuration according to Variation 4 of an exemplary embodiment.

For example, as in Variation 4 illustrated in FIG. 8, the first end portions of first wires 13a to 13e may be connected to the end portions of transmitting electrodes 11a to 11e that are located near side b1 of rectangular region R, and the first end portions of second wires 14a to 14e may be connected to the end portions of transmitting electrodes 11a to 11e that are located near side b4 of rectangular region R.

Even such touch sensor 1 according to Variation 4 is configured so that first wires 13a, 13f connected to shortest transmitting electrodes 11a, 11f and second wires 14a, 14f connected to shortest receiving electrodes 12a, 12f do not cross each other, as in touch sensor 1 according to the above-described exemplary embodiment. Therefore, even in touch sensor 1 according to Variation 4, it is possible to prevent degradation in electrical properties by preventing the aforementioned capacitive coupling.

Variation 5 of Exemplary Embodiment

Touch sensors 1 according to the exemplary embodiment and Variations 1 to 4 described above are formed so that first wires 13a to 13f and second wires 14a to 14f are evenly distributed in four directions of sensor region S, but this is not limiting. This means that first wires 13a to 13f and second wires 14a to 14f do not need to be evenly distributed in four directions of sensor region S.

Figure 9:
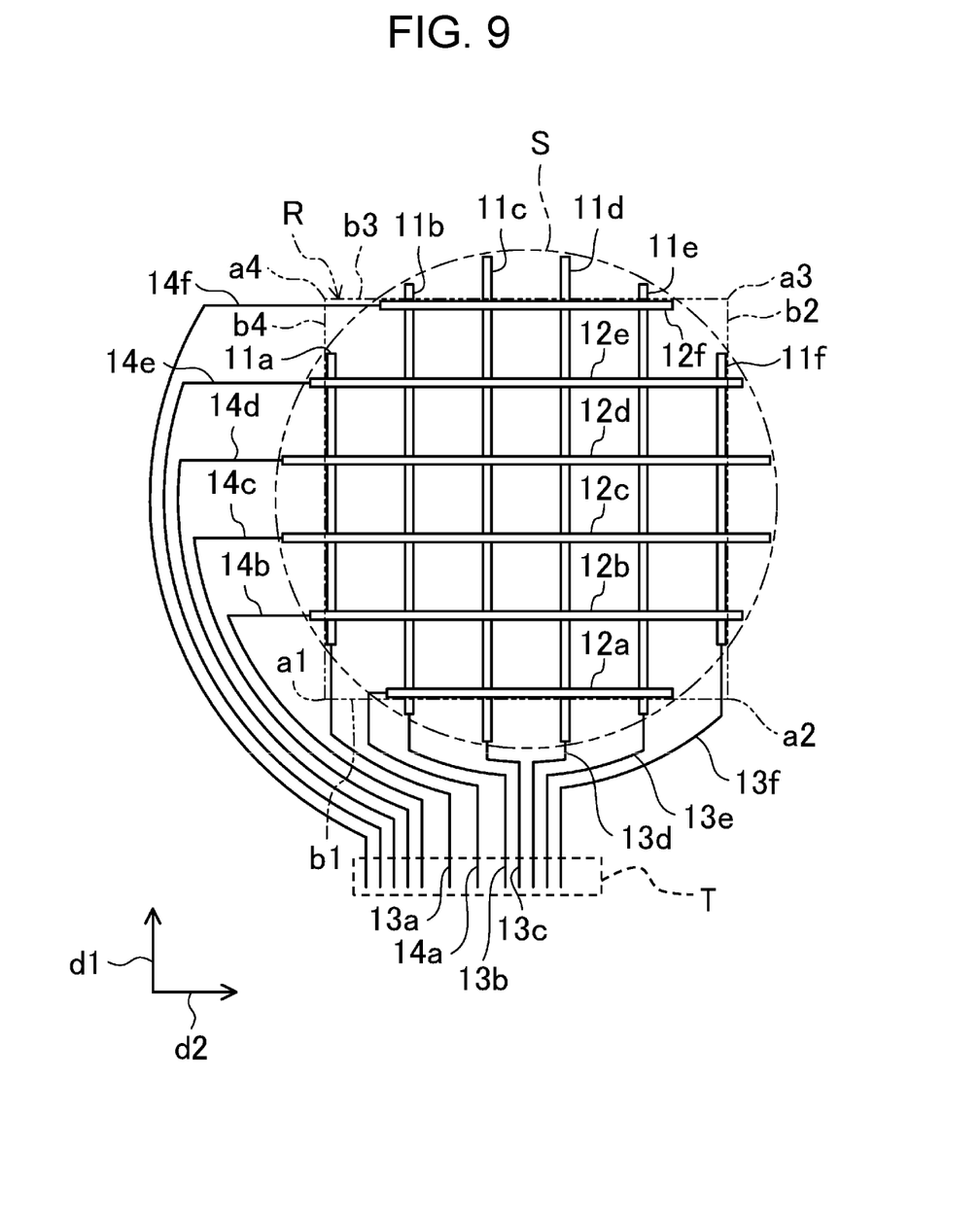
FIG. 9 is a FIG. 2-equivalent diagram illustrating the configuration according to Variation 5 of an exemplary embodiment.

For example, as in Variation 5 illustrated in FIG. 9, the first end portions of first wires 13a to 13f may be connected to the end portions of transmitting electrodes 11a to 11f that are located near side b1 of rectangular region R. Furthermore, the first end portions of second wires 14a to 14f may be connected to the end portions of receiving electrodes 12a to 12f that are located near side b4 of rectangular region R.

Shortest second wire 14a is disposed between shortest first wire 13a and first wire 13b. Second wire 14a extends in the direction in which first wire 13a and first wire 13b extend.

In this manner, first wire 13a having the first end portion connected to the end portion of transmitting electrode 11a and second wire 14a having the first end portion connected to the end portion of receiving electrode 12a are spaced apart from each other and disposed so that the second end portion of first wire 13a and the second end portion of second wire 14a are oriented in the same direction. In other words, touch sensor 1 according to Variation 5 is configured so that first wire 13a and second wire 14a do not cross each other. With this configuration, even in touch sensor 1 according to Variation 5, it is possible to prevent degradation in electrical properties by preventing the aforementioned capacitive coupling.

Other Exemplary Embodiments

In the above-described exemplary embodiment, first direction d1 and second direction d2 are defined as those directions illustrated in FIG. 2 for convenience of description, but are not limited to said directions. For example, the rightward direction in FIG. 2 may be denoted as first direction d1, and the upward direction in FIG. 2 may be denoted as second direction d2. This means that transmitting electrodes 11a to 11f may be configured to extend horizontally as illustrated in FIG. 4 and receiving electrodes 12a to 12f may be configured to extend vertically as illustrated in FIG. 3.

Furthermore, in the above-described exemplary embodiment, second substrate 7 is layered on top of first substrate 6, but this is not limiting. Specifically, first substrate 6 may be layered on top of second substrate 7. In such a form, transmitting electrodes 11a to 11f formed on first substrate 6 are positioned above (in other words, on the cover member 2 side of) receiving electrodes 12a to 12f formed on second substrate 7. Note that in such a form, cutout portions (not illustrated in the drawings) for exposing the end portions of second wires 14a to 14f when first substrate 6 and second substrate 7 are bonded together need to be formed in connecting portion 6a of first substrate 6, but cutout portions 7b, 7b described in the above exemplary embodiment are no longer needed.

Furthermore, in the above-described exemplary embodiment, touch sensor 1 includes first substrate 6 and second substrate 7, but this is not limiting. Specifically, touch sensor 1 may include, for example, second substrate 7 only, and transmitting electrodes 11a to 11f and first wires 13a to 13f may be formed on the lower surface of second substrate 7. Alternatively, (i) transmitting electrodes 11a to 11f and first wires 13a to 13f and (ii) receiving electrodes 12a to 12f and second wires 14a to 14f that are kept insulated from each other may be disposed on the same side of one of first substrate 6 and second substrate 7. Note that the same applies to Variations 1 to 5 described above.

Furthermore, in the above-described exemplary embodiment, each of first substrate 6 and second substrate 7 is formed in the approximate shape of a circle, but this is not limiting. For example, each of first and second substrates 7 may be formed in the shape of a rectangle or the like.

Furthermore, in the above-described exemplary embodiment, each of transmitting electrodes 11a to 11f is in the approximate shape of a strip, but this is not limiting. For example, each of transmitting electrodes 11a to 11f may be in such a form that protrusions (not illustrated in the drawings) each of which is an intermediate portion protruding and tapered in second direction d2 or in the direction opposite thereto are repeatedly arranged in the direction in which the transmitting electrode extends. Similarly, instead of being in the approximate shape of a strip described in the above exemplary embodiment, each of receiving electrodes 12a to 12f may also be in such a form that protrusions (not illustrated in the drawings) each of which is an intermediate portion protruding and tapered in first direction d1 or in the direction opposite thereto are repeatedly arranged in the direction in which the receiving electrode extends. In other words, the shape of each electrode may be the shape of pad parts in a fixed form such as a rhomboid repeated in the direction in which the electrode extends. Note that the same applies to Variations 1 to 5 described above.

Furthermore, in the above-described exemplary embodiment, transmitting electrodes 11a to 11f are formed so as to have three different lengths, but this is not limiting. For example, transmitting electrodes 11a to 11f may be formed so as to have two different lengths as in Variation 3 illustrated in FIG. 7. The same applies to receiving electrodes 12a to 12f.

The exemplary embodiment of the present disclosure has thus far been described, but the present disclosure is not limited to the above-described exemplary embodiment, and various changes can be made within the scope of the invention.

Closing

Touch sensor 1 according to one aspect of the present disclosure includes: transmitting electrodes 11a to 11f each extending in first direction d1 and spaced apart in second direction d2 orthogonal to first direction d1; receiving electrodes 12a to 12f each extending in second direction d2 and spaced apart in first direction d1; first wires 13a to 13f each electrically connected to one corresponding transmitting electrode included in transmitting electrodes 11a to 11f; and second wires 14a to 14f each electrically connected to one corresponding receiving electrode included in receiving electrodes 12a to 12f. Transmitting electrodes 11a to 11f include transmitting electrodes of different lengths. Transmitting electrode 11a disposed at one end among transmitting electrodes 11a to 11f is shortest among transmitting electrodes 11a to 11f. Receiving electrode 12a disposed at one end among receiving electrodes 12a to 12f is shortest among receiving electrodes 12a to 12f. Transmitting electrode 11a and receiving electrode 12a are disposed in a manner to avoid overlapping with each other in plan view. First wires 13a to 13f include first wire 13a connected to end portion 11aa of transmitting electrode 11a. Second wires 14a to 14f include second wire 14a connected to an end portion of receiving electrode 12a. First wire 13a connected to the end portion of transmitting electrode 11a and second wire 14a connected to the end portion of receiving electrode 12a are disposed in a manner to avoid overlapping with each other in plan view. First wire 13a connected to transmitting electrode 11a has first end portion 13aa connected to end portion 11aa of transmitting electrode 11a, which is located in the direction opposite to first direction d1, and has second end portion 13ac extending toward end portion region T. Second wire 14a connected to receiving electrode 12a has a first end portion connected to the end portion of receiving electrode 12a located in second direction d2 and has a second end portion extending toward end portion region T.

In touch sensor 1 according to another aspect of the present disclosure, transmitting electrode 11f located at the other end among transmitting electrodes 11a to 11f is equal in length to transmitting electrode 11a, and second receiving electrode 12f located at the other end among receiving electrodes 12a to 12f is equal in length to receiving electrode 12a. First wires 13a to 13f include first wire 13f connected to end portion 11fa of transmitting electrode 11f. Second wires 14a to 14f include second wire 14f connected to an end portion of receiving electrode 12f. First wire 13f connected to transmitting electrode 11f has first end portion 13fa connected to end portion 11fa of transmitting electrode 11f located in first direction d1 and has second end portion 13fc extending toward end portion region T. Second wire 14f connected to second receiving electrode 12f has a first end portion connected to the end portion of second receiving electrode 14f located in second direction d2 and has a second end portion extending toward end portion region T.

In touch sensor 1 according to another aspect of the present disclosure, one of first wires 13a to 13f (first wire 13b) is connected to an end portion of transmitting electrode 11b, which is included in transmitting electrodes 11a to 11f and adjacent to transmitting electrode 11a, located in the direction opposite to first direction d1. One of second wires 14a to 14f (second wire 14b) is connected to an end portion of receiving electrode 12b, which is included in receiving electrodes 12a to 12f and adjacent to receiving electrode 12a, located in second direction d2.

For example, as illustrated in FIG. 9, in touch sensor 1 according to another aspect of the present disclosure, first wires 13a to 13f to be connected to transmitting electrodes 11a to 11f are connected to end portions of transmitting electrodes 11a to 11f located in the direction opposite to first direction d1, and second wires 14a to 14f to be connected to receiving electrodes 12a to 12f are connected to end portions of receiving electrodes 12a to 12f located in second direction d2.

For example, as illustrated in FIG. 1, touch sensor 1 according to another aspect of the present disclosure further includes cover member 2 above transmitting electrodes 11a to 11f and receiving electrodes 12a to 12f, and cover member 2 includes decorative part 3 in a predetermined region from the outer edge toward the center of cover member 2, and transmitting electrodes 11a to 11f and receiving electrodes 12a to 12f are disposed below a region (operating surface) surrounded by decorative part 3.

Touch sensor 1 according to another aspect of the present disclosure further includes: first substrate 6 on which transmitting electrodes 11a to 11f are provided; second substrate 7 on which receiving electrodes 12a to 12f are provided; and flexible wiring board 5 connected to first substrate 6 or second substrate 7. End portion region T is provided on flexible wiring board 5.

INDUSTRIAL APPLICABILITY

The present disclosure is industrially applicable as an input device of the touch sensor type on which touch operations are possible.

REFERENCE MARKS IN THE DRAWINGS 1 touch sensor
2 cover member
3 decorative part
4 operating surface
5 flexible wiring board
6 first substrate
6a, 7a connecting portion 7 second substrate
11a-11f transmitting electrode
12a-12f receiving electrode
13a-13f first wire
13aa first end portion
13ab intermediate portion
13ac second end portion
13fa first end portion
13fb intermediate portion
13fc second end portion
14a-14f second wire
R rectangular region
S sensor region
T end region (first region)
a1 first vertex
a2 second vertex
a3 third vertex
a4 fourth vertex
d1 first direction
d2 second direction

The invention claimed is:

1. A touch sensor, comprising:
a plurality of transmitting electrodes each extending in a first direction and spaced apart in a second direction orthogonal to the first direction;
a plurality of receiving electrodes each extending in the second direction and spaced apart in the first direction;
a plurality of first wires each electrically connected to one corresponding transmitting electrode included in the plurality of transmitting electrodes; and
a plurality of second wires each electrically connected to one corresponding receiving electrode included in the plurality of receiving electrodes, wherein
the plurality of transmitting electrodes include transmitting electrodes of different lengths,
a first transmitting electrode disposed at one end among the plurality of transmitting electrodes is shortest among the plurality of transmitting electrodes,
a first receiving electrode disposed at one end among the plurality of receiving electrodes is shortest among the plurality of receiving electrodes,
the first transmitting electrode and the first receiving electrode are disposed in a manner to avoid overlapping with each other in plan view,
the plurality of first wires include a wire connected to an end portion of the first transmitting electrode,
the plurality of second wires include a wire connected to an end portion of the first receiving electrode,
the wire connected to the end portion of the first transmitting electrode and the wire connected to the end portion of the first receiving electrode are disposed in a manner to avoid overlapping with each other in plan view,
the wire connected to the first transmitting electrode has a first end portion connected to the end portion of the first transmitting electrode located in a direction opposite to the first direction and has a second end portion extending toward a first region, and
the wire connected to the first receiving electrode has a first end portion connected to the end portion of the first receiving electrode located in the second direction and has a second end portion extending toward the first region.

2. The touch sensor according to claim 1, wherein
a second transmitting electrode located at an other end among the plurality of transmitting electrodes is equal in length to the first transmitting electrode,
a second receiving electrode located at an other end among the plurality of receiving electrodes is equal in length to the first receiving electrode,
the plurality of first wires include a wire connected to an end portion of the second transmitting electrode,
the plurality of second wires include a wire connected to an end portion of the second receiving electrode,
the wire connected to the second transmitting electrode has a first end portion connected to the end portion of the second transmitting electrode located in the first direction and has a second end portion extending toward the first region, and
the wire connected to the second receiving electrode has a first end portion connected to the end portion of the second receiving electrode located in a direction opposite to the second direction and has a second end portion extending toward the first region.

3. The touch sensor according to claim 2, wherein
one of the plurality of first wires is connected to an end portion of a third transmitting electrode located in the direction opposite to the first direction, the third transmitting electrode being included in the plurality of transmitting electrodes and adjacent to the first transmitting electrode, and
one of the plurality of second wires is connected to an end portion of a third receiving electrode located in the second direction, the third receiving electrode being included in the plurality of receiving electrodes and adjacent to the first receiving electrode.

4. The touch sensor according to claim 2, further comprising:
a cover member above the plurality of transmitting electrodes and the plurality of receiving electrodes, wherein
the cover member includes a decorative part in a predetermined region from an outer edge toward a center of the cover member, and
the plurality of transmitting electrodes and the plurality of receiving electrodes are disposed below a region surrounded by the decorative part.

5. The touch sensor according to claim 2, further comprising:
a first substrate on which the plurality of transmitting electrodes are provided;
a second substrate on which the plurality of receiving electrodes are provided; and
a wiring board connected to the first substrate or the second substrate, wherein
the first region is provided on the wiring board.

6. The touch sensor according to claim 1, wherein
the plurality of first wires to be connected to the plurality of transmitting electrodes are connected to end portions of the plurality of transmitting electrodes located in the direction opposite to the first direction, and
the plurality of second wires to be connected to the plurality of receiving electrodes are connected to end portions of the plurality of receiving electrodes located in the second direction.

7. The touch sensor according to claim 6, further comprising:
a cover member above the plurality of transmitting electrodes and the plurality of receiving electrodes, wherein
the cover member includes a decorative part in a predetermined region from an outer edge toward a center of the cover member, and
the plurality of transmitting electrodes and the plurality of receiving electrodes are disposed below a region surrounded by the decorative part.

8. The touch sensor according to claim 6, further comprising:
- a first substrate on which the plurality of transmitting electrodes are provided;
- a second substrate on which the plurality of receiving electrodes are provided; and
- a wiring board connected to the first substrate or the second substrate, wherein
- the first region is provided on the wiring board.

9. The touch sensor according to claim 1, further comprising:
- a cover member above the plurality of transmitting electrodes and the plurality of receiving electrodes, wherein
- the cover member includes a decorative part in a predetermined region from an outer edge toward a center of the cover member, and
- the plurality of transmitting electrodes and the plurality of receiving electrodes are disposed below a region surrounded by the decorative part.

10. The touch sensor according to claim 1, further comprising:
- a first substrate on which the plurality of transmitting electrodes are provided;
- a second substrate on which the plurality of receiving electrodes are provided; and
- a wiring board connected to the first substrate or the second substrate, wherein
- the first region is provided on the wiring board.

* * * * *